(12) United States Patent
Usui et al.

(10) Patent No.: US 11,512,190 B2
(45) Date of Patent: Nov. 29, 2022

(54) ETHYLENE-VINYL ALCOHOL COPOLYMER COMPOSITION, PELLETS, AND MULTILAYER STRUCTURE

(71) Applicant: Mitsubishi Chemical Corporation, Tokyo (JP)

(72) Inventors: Shintaro Usui, Tokyo (JP); Daichi Nishimura, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/683,769

(22) Filed: Nov. 14, 2019

(65) Prior Publication Data

US 2020/0079940 A1    Mar. 12, 2020

Related U.S. Application Data

(63) Continuation of application No. PCT/JP2018/024304, filed on Jun. 27, 2018.

(30) Foreign Application Priority Data

Jun. 27, 2017 (JP) .............................. JP2017-124965

(51) Int. Cl.
| | | |
|---|---|---|
| *C08L 23/08* | (2006.01) | |
| *C08L 29/04* | (2006.01) | |
| *C08L 77/00* | (2006.01) | |
| *C08K 3/11* | (2018.01) | |
| *B29B 9/12* | (2006.01) | |
| *B32B 27/18* | (2006.01) | |
| *B32B 27/30* | (2006.01) | |
| *B32B 27/32* | (2006.01) | |
| *B32B 27/34* | (2006.01) | |
| *C08K 3/32* | (2006.01) | |

(52) U.S. Cl.
CPC .............. *C08L 23/08* (2013.01); *B29B 9/12* (2013.01); *B32B 27/18* (2013.01); *B32B 27/306* (2013.01); *B32B 27/32* (2013.01); *B32B 27/34* (2013.01); *C08K 3/11* (2018.01); *C08K 3/32* (2013.01); *C08L 29/04* (2013.01); *C08L 77/00* (2013.01); *B32B 2439/70* (2013.01); *B32B 2439/80* (2013.01); *C08K 2003/321* (2013.01); *C08L 2201/10* (2013.01); *C08L 2201/14* (2013.01); *C08L 2203/16* (2013.01)

(58) Field of Classification Search
CPC .... C08K 3/11; C08K 2003/2265–2275; C08K 2003/3072; C08L 23/846; C08L 23/853; C08L 23/861; C08L 29/04; C08L 77/00–12
See application file for complete search history.

(56) References Cited

U.S. PATENT DOCUMENTS

| | | |
|---|---|---|
| 5,164,438 A | 11/1992 | Umeyama et al. |
| 6,759,107 B1 | 7/2004 | Tai et al. |
| 2003/0157283 A1 | 8/2003 | Tai et al. |
| 2007/0148481 A1 | 6/2007 | Onishi |
| 2007/0243351 A1* | 10/2007 | Tai .................... C08L 29/04 |
| | | 428/35.8 |
| 2010/0051861 A1 | 3/2010 | Inubushi et al. |
| 2015/0159005 A1 | 6/2015 | Nakazawa et al. |
| 2016/0221314 A1 | 8/2016 | Kawai |
| 2017/0183426 A1 | 6/2017 | Kawai et al. |
| 2018/0355163 A1 | 12/2018 | Sato et al. |
| 2019/0002612 A1 | 1/2019 | Nishimura et al. |
| 2019/0010305 A1 | 1/2019 | Nishimura et al. |

FOREIGN PATENT DOCUMENTS

| | | |
|---|---|---|
| CN | 1266071 A | 9/2000 |
| CN | 1280148 A | 1/2001 |
| CN | 1392889 A | 1/2003 |
| CN | 1898088 A | 1/2007 |
| CN | 101516994 A | 8/2009 |
| CN | 104350102 A | 2/2015 |
| CN | 105593290 A | 5/2016 |
| CN | 106795232 A | 5/2017 |
| JP | H07-330994 | 12/1995 |
| JP | H09-77948 | 3/1997 |
| JP | 2000-136281 | 5/2000 |
| JP | 2005-082226 A | 3/2005 |
| JP | 2005-178324 | 7/2005 |
| JP | 2008-230112 | 10/2008 |
| JP | 2009-242591 | 10/2009 |
| JP | 2012-210763 A | 11/2012 |
| WO | 2013/146533 | 10/2013 |
| WO | 2017/115847 | 7/2017 |

(Continued)

OTHER PUBLICATIONS

ISR issued in WIPO Patent Application No. PCT/JP2018/024304, dated Oct. 2, 2018, (w/ English translation).
IPRP issued in WIPO Patent Application No. PCT/JP2018/024304, dated Dec. 31, 2019, (w/ English translation).
ISR issued in WIPO Patent Application No. PCT/JP2016/089122, dated Feb. 7, 2017, (English translation).
IPRP issued in WIPO Patent Application No. PCT/JP2016/089122, dated Feb. 7, 2017, (English translation).
Office Action issued in Singapore Patent Appl. No. 11201804720P, dated Jun. 26, 2019.
European Search Report issued in EP Patent Application No. 18825236.5, dated Jun. 5, 2020.

(Continued)

*Primary Examiner* — Ana L. Woodward
(74) *Attorney, Agent, or Firm* — Greenblum & Bernstein, P.L.C.

(57) ABSTRACT

An ethylene-vinyl alcohol copolymer composition is substantially free from coloration, and contains: (A) an ethylene-vinyl alcohol copolymer; (B) a polyamide resin; and (C) an iron compound; wherein the iron compound (C) is present in an amount of 0.01 to 20 ppm on a metal basis based on the weight of the ethylene-vinyl alcohol copolymer composition.

3 Claims, No Drawings

(56) References Cited

FOREIGN PATENT DOCUMENTS

WO    2017/115848    7/2017
WO    2017/115849    7/2017

OTHER PUBLICATIONS

Singaporean Office Action issued in SG Patent Application No. 11201910717Y, dated Nov. 9, 2020.
Office Action issued in Japanese Patent Application No. 2018-534185, dated Jun. 29, 2021, English translation.
Office Action issued in CN Patent Application No. 201880032794.6, dated Sep. 3, 2021, English translation.
Office Action issued in TW Patent Application No. 107122169, dated Sep. 23, 2021, English translation.
Office Action issued in TW Patent Application No. 107122169, dated May 18, 2022, English translation.
Office Action issued in SG Patent Application No. 11201910717Y, dated Jul. 28, 2022.

\* cited by examiner

ETHYLENE-VINYL ALCOHOL COPOLYMER COMPOSITION, PELLETS, AND MULTILAYER STRUCTURE

RELATED APPLICATION

This application is a continuation of International Application No. PCT/JP2018/024304, filed on Jun. 27, 2018, which claims priority to Japanese Patent Application No. 2017-124965, filed on Jun. 27, 2017, the entire contents of each of which being hereby incorporated by reference.

TECHNICAL FIELD

The present disclosure relates to an ethylene-vinyl alcohol copolymer composition containing an ethylene-vinyl alcohol copolymer (hereinafter referred to as "EVOH resin"), and further relates to pellets and to a multilayer structure. More specifically, the present disclosure relates to an EVOH resin composition substantially free from coloration and viscosity increase with time, and further relates to pellets formed from the EVOH resin composition and to a multilayer structure including a layer formed from the EVOH resin composition.

BACKGROUND ART

The EVOH resin is excellent in transparency, gas barrier properties such as oxygen barrier property, aroma retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials. When a packaging material including an EVOH resin layer is subjected to a hot-water sterilization process such as retort process or boiling process, however, the EVOH resin layer is liable to dissolve out of the packaging material into water, or to have poorer gas barrier property. A known art for coping with this is to use a polyamide resin in combination with the EVOH resin (see, for example, PTL 1 and PTL 2).

RELATED ART DOCUMENTS

Patent Documents

PTL 1: JP-A-2005-178324
PTL 2: JP-A-2009-242591

SUMMARY

On the other hand, a resin composition containing the EVOH resin and the polyamide resin is liable to be colored due to heating during melt kneading or melt forming, and to suffer from viscosity increase with time. In view of this, the resin composition needs improvement.

The inventors conducted intensive studies in view of the foregoing and, as a result, found that, where the resin composition containing the EVOH resin and the polyamide resin further contains a very small amount of an iron compound, the above problem can be solved.

According to a first aspect of the present disclosure, there is provided an EVOH resin composition containing: (A) an EVOH resin; (B) a polyamide resin; and (C) an iron compound; wherein the iron compound (C) is present in an amount of 0.01 to 20 ppm on a metal basis based on the weight of the EVOH resin composition. According to a second aspect of the present disclosure, pellets formed from the EVOH resin composition are provided. According to a third aspect of the present disclosure, a multilayer structure including a layer formed from the EVOH resin composition is provided.

The EVOH resin composition of the present disclosure contains the EVOH resin (A), the polyamide resin (B), and the iron compound (C). In the EVOH resin composition, the iron compound (C) is present in an amount of 0.01 to 20 ppm on a metal basis based on the weight of the EVOH resin composition. The EVOH resin composition is substantially free from the coloration, and excellent in dynamic viscosity behavior.

Where the weight ratio of the EVOH resin (A) to the polyamide resin (B) is (A)/(B)=99/1 to 10/90, the EVOH resin composition is more superior in coloration-suppressing effect.

The pellets formed from the EVOH resin composition of the present disclosure are substantially free from the coloration. Therefore, the pellets of the present disclosure can be advantageously used, for example, as a packaging material for foods, chemicals, agricultural chemicals, and the like, particularly as a hot-water sterilizable packaging material.

The multilayer structure including the layer formed from the EVOH resin composition of the present disclosure is substantially free from the coloration. Therefore, the multilayer structure of the present disclosure can be formed into various products, and can be advantageously used, for example, as a packaging material for foods, chemicals, agricultural chemicals, and the like, particularly as a hot-water sterilizable packaging material.

DESCRIPTION OF EMBODIMENTS

Preferred embodiments of the present disclosure will hereinafter be described in detail. It should be understood that these preferred embodiments are illustrative but not limitative.

EVOH Resin Composition

The EVOH resin composition of the present disclosure contains: (A) an EVOH resin; (B) a polyamide resin; and (C) an iron compound. In the EVOH resin composition of the present disclosure, the EVOH resin (A) and the polyamide resin (B) are present as main components. That is, the total proportion of the EVOH resin (A) and the polyamide resin (B) in the EVOH resin composition is typically not less than 70 wt. %, preferably not less than 80 wt. %, more preferably not less than 90 wt. %, particularly preferably not less than 95 wt. %. The respective components will hereinafter be described in turn.

EVOH Resin (A)

The EVOH resin (A) to be used in the present disclosure is a water-insoluble thermoplastic resin typically prepared by saponifying a copolymer of ethylene and a vinyl ester monomer, i.e., an ethylene-vinyl ester copolymer. Vinyl acetate is generally used as the vinyl ester monomer for economy.

A known polymerization method such as solution polymerization method, suspension polymerization method or emulsion polymerization method may be utilized for polymerization of ethylene and the vinyl ester monomer. In general, a solution polymerization method using methanol as a solvent is utilized. The saponification of the resulting ethylene-vinyl ester copolymer may be achieved by a known method.

The EVOH resin (A) thus prepared mainly contains an ethylene structural unit and a vinyl alcohol structural unit, and further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The ethylene structural unit content of the EVOH resin (A) can be controlled by adjusting the pressure of ethylene to be supplied when ethylene and the vinyl ester monomer are copolymerized. The ethylene structural unit content of the EVOH resin (A) is typically 20 to 60 mol %, preferably 25 to 50 mol %, particularly preferably 25 to 35 mol %. If the ethylene structural unit content is excessively low, the EVOH resin composition tends to be poorer in high-humidity gas barrier property and stretchability. If the ethylene structural unit content is excessively high, on the other hand, the EVOH resin composition tends to be poorer in gas barrier property. The ethylene structural unit content may be measured in conformity with ISO14663.

The vinyl ester saponification degree of the EVOH resin (A) can be controlled by adjusting the amount of a saponification catalyst (typically, an alkaline catalyst such as sodium hydroxide), a saponification temperature, a saponification period, and the like for the saponification of the ethylene-vinyl ester copolymer. The saponification degree is typically 90 to 100 mol %, preferably 95 to 100 mol %, particularly preferably 98 to 100 mol %. If the saponification degree is excessively low, the EVOH resin composition tends to be poorer in gas barrier property, heat stability, humidity resistance, and the like. The saponification degree of the EVOH resin is measured in conformity with JIS K6726 (with the use of a solution obtained by homogenously dissolving the EVOH resin in a water/methanol solvent).

The EVOH resin (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH resin (A) is excessively high, the EVOH resin composition tends to have unstable film formability. If the MFR of the EVOH resin (A) is excessively low, the EVOH resin composition tends to have an excessively high viscosity, making melt extrusion difficult. The MFR, which is an index of the polymerization degree of the EVOH resin, can be controlled by adjusting the amount of a polymerization initiator and the amount of a solvent in the copolymerization of ethylene and the vinyl ester monomer.

The EVOH resin (A) to be used in the present disclosure may further contain a structural unit derived from any of the following comonomers in an amount (e.g., not greater than 20 mol % of the EVOH resin (A)) that does not impair the effects of the present disclosure.

The comonomers include: olefins such as propylene, 1-butene, and isobutene, hydroxyl-containing $\alpha$-olefins such as 3-buten-1-ol, 3-butene-1,2-diol, 4-penten-1-ol, and 5-hexene-1,2-diol, and derivatives including esterification products and acylation products of these hydroxyl-containing $\alpha$-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1- to C18-alkyl group; acrylamide compounds such as acrylamide, N-alkylacrylamides each including a C1- to C18-alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1- to C18-alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1- to C18-alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate; halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH resin having a primary hydroxyl group in its side chain is particularly preferred because of its gas barrier property and excellent secondary formability. Particularly, an EVOH resin prepared by copolymerization with the hydroxyl-containing $\alpha$-olefin is preferred, and an EVOH resin having a 1,2-diol structure in its side chain is especially preferred. Particularly, where the EVOH resin having a primary hydroxyl group in its side chain is used, the primary hydroxyl group content of the EVOH resin is typically 0.1 to 20 mol %, preferably 0.5 to 15 mol %, particularly preferably 1 to 10 mol %, of the EVOH resin.

The EVOH resin (A) to be used in the present disclosure may be a post-modified EVOH resin such as a urethanized, acetalized, cyanoethylated or oxyalkylenated EVOH resin.

The EVOH resin (A) to be used in the present disclosure may be a mixture of different EVOH resins. These EVOH resins may have different ethylene structural unit contents, different saponification degrees, and different polymerization degrees, and contain different comonomer components. Particularly, two or more EVOH resins having different ethylene structural unit contents are preferably used as the EVOH resin (A) in order to impart the EVOH resin composition with excellent secondary formability while ensuring the gas barrier property.

Polyamide Resin (B)

The polyamide resin (B) to be used in the present disclosure is a known water-insoluble thermoplastic resin.

Examples of the polyamide resin (B) include: homopolymers such as polycapramide (nylon 6), poly-ω-aminoheptanoic acid (nylon 7), poly-ω-aminononanoic acid (nylon 9), polyundecanamide (nylon 11), and polylauryllactam (nylon 12); polyamide copolymer resins including aliphatic polyamides such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymers (nylon 6/12), caprolactam/ω-aminononanoic acid copolymers (nylon 6/9), caprolactam/hexamethylenediammonium adipate copolymers (nylon 6/66), lauryllactam/hexamethylenediammonium adipate copolymers (nylon 12/66), ethylenediamine adipamide/hexamethylenediammonium adipate copolymers (nylon 26/66), caprolactam/hexamethylenediammonium adipate/hexamethylenediammonium sebacate copolymers (nylon 66/610), and ethyleneammonium adipate/hexamethylenediammonium adipate/hexamethylenediammonium sebacate copolymers (nylon 6/66/610), and aromatic polyamides such as polyhexamethylene isophthalamide, polyhexamethylene terephthalamide, poly-m-xylylene adipamide, hexamethylene isophthalamide/terephthalamide copolymers, poly-p-phenylene terephthalamide, and poly-p-phenylene/3,4'-diphenyl ether terephthalamide; and amorphous polyamides, polyamide resins obtained by modifying any of these polyamide resins with an aromatic amine such as methylenebenzylamine or m-xylenediamine, and m-xylylenediammonium adipate. These polyamide resins may be terminal-modified. A polyamide resin obtained by terminal-modifying any of these polyamide resins is preferred. These polyamide resins may be used alone or in combination as the polyamide resin (B).

The polyamide resin (B) tends to have a higher bonding force to a resin having a polar group (e.g., EVOH resin).

The molecular weight percentage of an amide bond in an amide monomer unit of the polyamide resin (B) (in the case of nylon 6, for example, the molecular weight percentage of the amide bond (—CONH—) in an amide monomer unit (—C$_6$H$_5$—CONH—)) is preferably 20 to 60%, more preferably 30 to 50%, particularly preferably 35 to 45%. If the amide bond percentage is excessively low, the polyamide resin (B) tends to have a reduced bonding force in an interface with respect to the polar resin (EVOH resin (A)). If the amide bond percentage is excessively high, on the other hand, the polyamide resin (B) tends to have an excessively high reactivity with respect to the polar resin (EVOH resin (A)) in melt forming. Therefore, poor appearance is liable to occur due to a rough bonding interface in coextrusion.

The polyamide resin (B) preferably has a melting point of 160° C. to 270° C., more preferably 175° C. to 250° C., particularly preferably 190° C. to 230° C. If the melting point of the polyamide resin (B) is excessively low, a multilayer structure produced by using the EVOH resin composition tends to be poorer in heat resistance. If the melting point of the polyamide resin (B) is excessively high, on the other hand, the EVOH resin composition tends to have a greater difference in melting point with respect to a resin to be used as a material for the other resin layer of the multilayer structure. Therefore, when the EVOH resin composition and the other resin are coextruded to be merged, layer turbulence is liable to occur, resulting in poorer appearance of the multilayer structure. Further, the coextrusion of the EVOH resin (A) and the polyamide resin (B) that has an excessively high melting point requires a higher die temperature and, therefore, the coloration of the multilayer structure is liable to be aggravated due to the thermal degradation of the EVOH resin (A).

In view of this, the polyamide resin (B) preferably has a melting point of 160° C. to 270° C., more preferably 175° C. to 250° C., particularly preferably 190° C. to 230° C., and an amide bond percentage of 20 to 60%, more preferably 30 to 50%, particularly preferably 35 to 45%. More specifically, the polyamide resin (B) is preferably nylon 6 (having a melting point of about 220° C. and an amide bond percentage of 38%), and nylon 6/66 (having a melting point of about 200° C. and an amide bond percentage of 38%).

The relative viscosity of the polyamide resin (B), which is an index of the polymerization degree, is preferably 1.5 to 6, more preferably 2.0 to 6, still more preferably 2.5 to 5, as measured in conformity with JIS K6810. If the relative viscosity is excessively small, it will be difficult to extrude the EVOH resin composition because a higher torque occurs in an extruder during the forming. If the relative viscosity is excessively great, a film or a sheet formed from the EVOH resin composition tends to have a poorer thickness accuracy. The relative viscosity is determined in conformity with JIS K6810 by completely dissolving 1 g of the polyamide resin (B) in 100 mL of 96% concentrated sulfuric acid, and measuring the viscosity of the resulting solution at 25° C. by means of a capillary viscometer.

The polyamide resin (B) typically has a terminal carboxyl group content of 10 to 40 µeq/g, preferably 15 to 30 µeq/g, particularly preferably 15 to 25 µeq/g. If the terminal carboxyl group content falls outside the aforementioned range, the EVOH resin composition tends to be poorer in heat stability. The terminal carboxyl group content is determined in the following manner.

Terminal Carboxyl Group Content

First, 0.2 g of the polyamide resin (B) is added to and dissolved in 15 mL of o-cresol with heating to 110° C. After the resulting solution is cooled to around a room temperature (23° C.), 10 mL of benzyl alcohol, 50 mL of o-cresol, and 50 µL of formaldehyde are added to the solution. The resulting solution is titrated with a 0.05 mol/L ethanolic potassium hydroxide titrant by means of a potentiometric titrator, whereby the terminal carboxyl group content (COOH, µeq/g) is determined.

In the EVOH resin composition of the present disclosure, the weight ratio of the EVOH resin (A) to the polyamide resin (B) is typically (A)/(B)=99/1 to 10/90, preferably 95/5 to 40/60, particularly preferably 90/10 to 60/40. If the weight ratio of the polyamide resin (B) is excessively small, the effect of blending the polyamide resin (e.g., hot-water sterilization resistance) tends to be reduced. If the weight ratio of the polyamide resin (B) is excessively great, the EVOH resin composition tends to be poorer in gas barrier property.

Iron Compound (C)

The EVOH resin composition of the present disclosure contains the iron compound (C) in addition to the EVOH resin (A) and the polyamide resin (B), and the iron compound (C) is present in a specific very small amount in the EVOH resin composition. With this arrangement, the EVOH resin composition of the present disclosure is substantially free from the coloration, and excellent in dynamic viscosity behavior.

The coloration of the EVOH resin composition containing the EVOH resin (A) and the polyamide resin (B) occurs supposedly because the hydroxyl groups and the polymer terminal carboxyl groups of the EVOH resin (A), the amide bonds, the amino groups, and the carboxyl groups of the polyamide resin (B), and other highly reactive portions are liable to experience condensation, decomposition, and other reactions.

Those skilled in the art generally refrain from using an EVOH resin composition containing an iron compound (C), because a product formed from the iron-containing EVOH resin composition is liable to be colored due to iron ions. In the present disclosure, however, it is unexpectedly found that, where the EVOH resin composition contains a very small amount of the iron compound (C), the EVOH resin composition is substantially free from the coloration after the heating.

The aforementioned effect can be provided supposedly because the iron compound provides stable trivalent iron ions and, even with a very small amount of the iron compound, the iron ions form ion bonds and chelates with the hydroxyl groups, the carboxyl groups, the amide bonds, the amino groups, and other functional groups to be stabilized, thereby suppressing the condensation and the decomposition and, hence, the coloration.

The iron compound (C) may be present, for example, as an iron oxide, an iron hydroxide, an iron chloride, or an iron salt, in an ionized form, or in the form of a complex coordinated with the resin or other ligands in the EVOH resin composition. Examples of the iron oxide include ferric oxide, ferrosoferric oxide, and ferrous oxide. Examples of the iron chloride include ferrous chloride, and ferric chloride. Examples of the iron hydroxide include ferrous hydroxide, and ferric hydroxide. Examples of the iron salt include inorganic salts such as iron phosphate andiron sulfate, and organic salts such as iron carboxylates (e.g., iron acetate, iron butyrate, iron stearate, and the like). These may be used alone or in combination.

From the viewpoint of the dispersibility in the EVOH resin composition, the iron compound (C) is preferably water-soluble. From the viewpoint of the dispersibility and the productivity, the iron compound (C) typically has a molecular weight of 100 to 10,000, preferably 100 to 1,000, particularly preferably 100 to 500.

The amount of the iron compound (C) contained in the EVOH resin composition of the present disclosure is 0.01 to 20 ppm, preferably 0.03 to 8 ppm, particularly preferably 0.05 to 3 ppm, especially preferably 0.05 to 0.8 ppm, on a metal basis based on the weight of the EVOH resin composition. If the amount of the iron compound (C) is excessively small, the EVOH resin composition is liable to have an insufficient coloration-suppressing effect. If the amount of the iron compound (C) is excessively great, on the other hand, the EVOH resin composition is liable to suffer from viscosity increase with time.

The amount of the iron compound (C) is determined by ashing 0.5 g of the EVOH resin composition in an infrared heating oven (in an oxygen stream at 650° C. for 1 hour), dissolving the resulting ash in an acid, diluting the resulting solution to a predetermined volume with purified water to prepare a sample solution, and analyzing the sample solution by an ICP-MS (7500ce available from Agilent Technologies, Inc. using a standard addition method).

Other Thermoplastic Resin

The EVOH resin composition of the present disclosure may contain a thermoplastic resin other than the EVOH resin (A) and the polyamide resin (B) in an amount (e.g., typically not greater than 30 wt. %, preferably not greater than 20 wt. %, particularly preferably not greater than 10 wt. %, based on the weight of the EVOH resin composition) that does not impair the effects of the present disclosure.

A known thermoplastic resin may be used as the other thermoplastic resin. Specific examples of the thermoplastic resin include polyolefin resins, polyester resins, polystyrene resins, polyvinyl chloride resins, polycarbonate resins, polyacrylic resins, ionomers, ethylene-acrylic acid copolymers, ethylene-acrylate copolymers, ethylene-methacrylic acid copolymers, ethylene-methacrylate copolymers, polyvinylidene chlorides, vinyl ester resins, polyester elastomers, polyurethane elastomers, chlorinated polyethylenes, and chlorinated polypropylenes, which may be used alone or in combination.

Other Additives

The EVOH resin composition of the present disclosure may contain additives that are generally blended with the EVOH resin, as long as the effects of the present disclosure are not impaired. Examples of the additives include: inorganic double salt (e.g., hydrotalcites); plasticizer (e.g., aliphatic polyhydric alcohol such as ethylene glycol, glycerin or hexanediol); oxygen absorber [e.g., inorganic oxygen absorber such as aluminum powder, potassium sulfite or photo-catalytic titanium oxide; organic compound oxygen absorber such as ascorbic acid, ascorbic acid ester, ascorbic acid metal salt, polyhydric phenol compound (e.g., hydroquinone, gallic acid, hydroxyl-containing phenol aldehyde resin or the like), coordination compound obtained by coordination-bonding nitrogen-containing compound and non-iron transition metal (e.g., bis-salicylaldehyde-imine cobalt, tetraethylenepentamine cobalt, cobalt-Schiff base complex, porphyrins, macrocyclic polyamine complex, polyethyleneimine-cobalt complex or the like), terpene compound, reaction product obtained by reaction between amino acid and hydroxyl-containing reductive substance, triphenylmethyl compound or the like; or polymer oxygen absorber such as coordination compound obtained by coordination-bonding nitrogen-containing resin and non-iron transition metal (e.g., combination of m-xylenediamine (MXD) nylon and cobalt), blend of tertiary hydrogen-containing resin and non-iron transition metal (e.g., combination of polypropylene and cobalt), blend of unsaturated carbon-carbon bond-containing resin and non-iron transition metal (e.g., combination of polybutadiene and cobalt), photo-oxidation degradative resin (e.g., polyketone), anthraquinone polymer (e.g., polyvinylanthraquinone), or mixture containing any of these blends and photo initiator (benzophenone or the like), peroxide scavenger (commercially available antioxidant or the like) or deodorant (active carbon or the like)); and heat stabilizer, photo stabilizer, UV absorber, colorant, antistatic agent, surfactant (not serving as lubricant), antibacterial agent, antiblocking agent, and filler (e.g., inorganic filler or the like). For the suppression of the coloration, the oxygen absorber is particularly preferred, and the terpene compound is especially preferred. These compounds may be used alone or in combination.

EVOH Resin Composition Production Method

Known examples of a method of producing the EVOH resin composition of the present disclosure by using the aforementioned ingredients include dry blending method, melt mixing method, solution mixing method, and impregnation method, which may be used in combination.

An example of the dry blending method is a method (i) including the step of dry-blending pellets containing the EVOH resin (A) and the polyamide resin (B) with the iron compound (C) by means of a tumbler or the like.

Examples of the melt mixing method include: a method (ii) including the steps of melt-kneading a dry blend of the iron compound (C) and pellets containing the EVOH resin (A) and the polyamide resin (B), and forming the resulting melt mixture into pellets or a product; and a method (iii) including the steps of adding the iron compound (C) to a melt mixture of the EVOH resin (A) and the polyamide resin (B), melt-kneading the resulting mixture, and forming the resulting melt mixture into pellets or a product.

Examples of the solution mixing method include: a method (iv) including the steps of preparing a solution by using commercially available pellets containing the EVOH resin (A) and the polyamide resin (B), adding the iron compound (C) to the solution, solidifying and forming the resulting solution into pellets, separating the pellets from the solution, and drying the pellets; and a method (v) including the steps of adding the iron compound (C) and a solution of the polyamide resin (B) to a homogeneous solution (water/alcohol solution or the like) of the EVOH resin in the preparation of the EVOH resin (A), solidifying and forming the resulting solution into pellets, separating the pellets from the solution, and drying the pellets.

An example of the impregnation method is a method (vi) including the steps of bringing pellets containing the EVOH resin (A) and the polyamide resin (B) into contact with an aqueous solution of the iron compound (C) to incorporate the iron compound (C) into the pellets, and then drying the resulting pellets.

In the present disclosure, the EVOH resin composition can be produced by using any of the aforementioned different methods in combination. Particularly, the melt mixing method is preferred, and the method (ii) is particularly preferred, because the resin composition produced by these methods is significantly improved in productivity and the effects of the present disclosure.

Pellets of the EVOH resin composition to be produced by any of the aforementioned methods, and the pellets containing the EVOH resin (A) and the polyamide resin (B) to be used in any of the aforementioned methods may each have any desired shape. The pellets may each have, for example, spherical shape, oval shape, cylindrical shape, cubic shape, square prism shape, or the like, and typically the oval shape or the cylindrical shape. The oval pellets typically each have a minor diameter of 1 to 10 mm and a major diameter of 1.5 to 30 mm, preferably a minor diameter of 2 to 6 mm and a major diameter of 3 to 20 mm, more preferably a minor diameter of 2.5 to 5.5 mm and a major diameter of 3.5 to 10 mm, for easy handling thereof in the subsequent use as a forming material. The cylindrical pellets typically each have a bottom diameter of 1 to 6 mm and a length of 1 to 6 mm, preferably a bottom diameter of 2 to 5 mm and a length of 2 to 5 mm.

As described above, a water-soluble iron compound is used as the iron compound (C) in the aforementioned methods. Examples of the iron compound include: iron oxides such as ferric oxide, ferrosoferric oxide, and ferrous oxide; iron chlorides such as ferrous chloride and ferric chloride; iron hydroxides such as ferrous hydroxide and ferric hydroxide; inorganic iron salts such as iron phosphate and iron sulfate; and organic iron salts such as iron carboxylates (e.g., iron acetate, iron butyrate, iron stearate, and the like). As described above, the iron compound (C) may be present in the form of a salt, in an ionized form, or in the form of a complex coordinated with the resin or other ligands in the EVOH resin composition.

Usable as the aqueous solution containing the iron compound (C) in the method (vi) are an aqueous solution of any of the aforementioned iron compounds, and an aqueous solution that contains iron ions released from a steel material immersed in water containing chemical agents. In this case, the amount (on a metal basis) of the iron compound (C) to be contained in the EVOH resin composition may be controlled by adjusting the concentration of the iron compound (C) in the aqueous solution in which the pellets are immersed, the immersion temperature, the immersion period, and/or the like. The immersion period is typically 0.5 to 48 hours, preferably 1 to 36 hours, and the immersion temperature is typically 10° C. to 40° C., preferably 20° C. to 35° C. After the immersion, the pellets are separated from the aqueous solution by a known method, and dried by a known drying method. Various drying methods are usable for the drying, and examples of the drying methods include a stationary drying method and a fluidized drying method, which may be used alone or in combination.

The EVOH resin composition pellets of the present disclosure typically have a water content of 0.01 to 0.5 wt. %, preferably 0.05 to 0.35 wt. %, particularly preferably 0.1 to 0.3 wt. %.

In the present disclosure, the water content of the EVOH resin composition pellets is measured and calculated in the following manner.

The weight (W1) of the EVOH resin composition pellets is measured by an electronic balance before the drying, and the EVOH resin composition pellets are dried at 150° C. for 5 hours in a hot air dryer and cooled for 30 minutes in a desiccator. Then, the weight (W2) of the resulting pellets is measured. The water content of the EVOH resin composition pellets is calculated from the following expression:

$$\text{Water content (wt. \%)}=[(W1-W2)/W1]\times 100$$

The EVOH resin composition pellets thus produced may be used as they are for the melt forming. In order to ensure stable feeding of the EVOH resin composition pellets in the melt forming, a known lubricant is preferably applied to surfaces of the pellets. Examples of the lubricant include: higher fatty acids having a carbon number of not less than 12 (e.g., lauric acid, myristic acid, palmitic acid, stearic acid, behenic acid, and oleic acid); esters of the higher fatty acids (e.g., methyl esters, isopropyl esters, butyl esters, and octyl esters of the higher fatty acids); amides of the higher fatty acids (e.g., saturated higher fatty acid amides such as lauramide, myristamide, palmitamide, stearamide, and behenamide, unsaturated higher fatty acid amides such as oleamide and erucamide, and bis-higher fatty acid amides such as ethylene bis-stearamide, ethylene bis-oleamide, ethylene bis-erucamide, and ethylene bis-lauramide); low-molecular-weight polyolefins (e.g., low-molecular-weight polyethylenes and low-molecular-weight polypropylenes each having a molecular weight of about 500 to about 10,000, and acid modification products of these low-molecular-weight polyolefins); and higher alcohols having a carbon number of not less than 6, ester oligomers, and fluorinated ethylene resins. These compounds may be used alone or in combination. The amount of the lubricant present on the pellets is typically not greater than 5 wt. %, preferably not greater than 1 wt. %, based on the weight of the EVOH resin composition.

The EVOH resin composition of the present disclosure may be prepared in any of various forms, e.g., in a pellet form, in a powdery form, or in a liquid form, for use as a forming material for various formed products. Particularly, the EVOH resin composition of the present disclosure is preferably provided as a melt-formable material, because the effects of the present disclosure can be efficiently provided. The EVOH resin composition of the present disclosure may be a resin composition prepared by mixing the EVOH resin composition with a resin other than the EVOH resin (A) and the polyamide resin (B).

Exemplary products to be formed from the EVOH resin composition for practical applications include a single-layer film formed by using the EVOH resin composition of the present disclosure, and a multilayer structure including a layer formed by using the EVOH resin composition of the present disclosure.

Multilayer Structure

The multilayer structure of the present disclosure includes a layer formed from the EVOH resin composition of the present disclosure. The layer formed from the EVOH resin composition of the present disclosure (hereinafter referred to as "EVOH resin composition layer") may be laminated with some other base material (hereinafter referred to as "base resin") containing a thermoplastic resin other than the EVOH resin composition of the present disclosure as a main component. Thus, the EVOH resin composition layer can be strengthened, protected from moisture and other influence, or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-$\alpha$-olefin (C4 to C20 $\alpha$-olefin) copolymers, polypropylene resins such as polypropylenes and propylene-$\alpha$-olefin (C4 to C20 $\alpha$-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, aromatic and aliphatic polyketones.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred.

Where EVOH resin composition layers a (a1, a2, . . . ) formed from the EVOH resin composition of the present disclosure and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the EVOH resin composition of the present disclosure and the base resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layers are provided between the EVOH resin composition layer and the base resin layers in the multilayer structure, the adhesive resin layers are present on opposite sides of the EVOH resin composition layer and, therefore, a highly hydrophobic adhesive resin is preferably used for the adhesive resin layers.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., in amounts of not greater than 30 wt. %, preferably not greater than 10 wt. % of the resin). These may be used alone or in combination.

In the present disclosure, a known laminating method may be employed for laminating together the EVOH resin composition layer and the base resin layer (optionally with the adhesive resin layer provided between the layers). Examples of the laminating method include: a method in which a film or a sheet of the EVOH resin composition of the present disclosure is laminated with the base resin by melt extrusion; a method in which the base resin layer is laminated with the EVOH resin composition of the present disclosure by melt extrusion; a method in which the EVOH resin composition and the base resin are coextruded; a method in which the EVOH resin composition layer and the base resin layer are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred from the viewpoint of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is preferably close to the melting point of the multilayer structure, and is typically selected from a range of about 40° C. to about 170° C., preferably about 60° C. to about 160° C. If the stretching temperature is excessively low, poorer stretchability will result. If the stretching temperature is excessively high, it will be difficult to ensure stable stretching.

The resulting multilayer structure may be further subjected to a heat-setting process to ensure dimensional stability after the stretching. The heat-setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the EVOH resin composition of the present disclosure is used as a shrinkable film, the stretched film may be cold-set so as to be imparted with a heat-shrinkable property by applying cold air over the stretched film without performing the above heat-setting process.

In some case, a cup-shaped or tray-shaped multilayer container may be produced from the multilayer structure of the present disclosure. For the production of the multilayer container, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the EVOH resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, and pharmaceutical products. In particular, the EVOH resin composition layer formed from the EVOH resin composition of the present disclosure is substantially free from the coloration and, therefore, is particularly useful as a hot-water sterilizable packaging material for foods, chemicals, agricultural chemicals, and the like.

EXAMPLES

The embodiments of the present disclosure will hereinafter be described more specifically by way of examples thereof. However, it should be understood that the present disclosure be not limited to the examples within the scope of the present disclosure.

In the following examples, "parts" means "parts by weight" unless otherwise specified.

Prior to implementation of Examples, pellets of the following EVOH resin (A) and polyamide resin (B) were prepared, and the amounts of an iron compound (C) contained in the EVOH resin (A) and the polyamide resin (B) were measured.

EVOH resin (A): Ethylene-vinyl alcohol copolymer having an ethylene structural unit content of 29 mol %, a saponification degree of 99.6 mol %, and an MFR of 3.9 g/10 minutes (as measured at 210° C. with a load of 2160 g)

Polyamide resin (B): Nylon 6 (NOVAMID 1028EN available from Mitsubishi Engineering-Plastics Corporation) having a melting point of 220° C. and a terminal carboxyl group content of 20 μeq/1 g polymer (molar equivalent per 1 g of the polymer)

Measurement of Amounts of Iron Compound (C)

The pellets of the EVOH resin (A) were freeze-pulverized, whereby a measurement sample was prepared. Then, 0.5 g of the measurement sample was ashed in an infrared heating oven (in an oxygen stream at 650° C. for 1 hour), and the resulting ash was dissolved in an acid. The resulting solution was diluted to a predetermined volume with purified water, whereby a sample solution was prepared. The sample solution was analyzed by an ICP-MS (ICP mass spectrometer 7500ce available from Agilent Technologies, Inc.) through a standard addition method. As a result, the amount of the iron compound (C) was 0 ppm on a metal basis.

The measurement was performed on the polyamide resin (B) in the same manner as on the EVOH resin (A). As a result, the amount of the iron compound (C) was 0.15 ppm on a metal basis.

Example 1

First, 80 parts of the pellets of the EVOH resin (A), 20 parts of the pellets of the polyamide resin (B), and 0.000034 parts (0.1 ppm on a metal basis based on the weight of EVOH resin composition) of iron (III) phosphate n-hydrate (available from Wako Pure Chemical Industries, Ltd., and having a drying loss of 20.9 wt. % when being dried at 230° C.) were preheated at 250° C. for 5 minutes and then melt-kneaded for 5 minutes by means of a plastograph (available from Brabender Corporation), whereby an EVOH resin composition of Example 1 was prepared. The EVOH resin composition thus prepared was pulverized by operating a crusher (SKR16-240 available from Sometani Sangyo Co., Ltd.) at a rotation speed of 650 rpm. The pulverized product of the EVOH resin composition was in a granular form having a size of 1- to 5-mm square.

Example 2

An EVOH resin composition and a pulverized product of the EVOH resin composition of Example 2 were prepared in substantially the same manner as in Example 1, except that the amount of the iron (III) phosphate n-hydrate was 0.00034 parts (1 ppm on a metal basis based on the weight of the EVOH resin composition).

Example 3

An EVOH resin composition and a pulverized product of the EVOH resin composition of Example 3 were prepared in substantially the same manner as in Example 1, except that the amount of the iron (III) phosphate n-hydrate was 0.0034 parts (10 ppm on a metal basis based on the weight of the EVOH resin composition).

Comparative Example 1

An EVOH resin composition and a pulverized product of the EVOH resin composition of Comparative Example 1 were prepared in substantially the same manner as in Example 1, except that the iron (III) phosphate n-hydrate was not blended.

The EVOH resin compositions of Examples 1 to 3, and Comparative Example 1 were each evaluated for coloration and dynamic viscosity behavior by the following methods. The results are shown below in Table 1.

Evaluation for Coloration

The pulverized products of the EVOH resin compositions prepared in the aforementioned manner were each used as a sample. Before heating, the YI value of the sample was measured by means of a spectrophotometer SE6000 available from Nippon Denshoku Industries Co., Ltd. At this time, the measurement was performed with the sample filled to the full in a cylinder having an inner diameter of 32 mm and a height of 30 mm. After the sample was heat-treated at 150° C. for 5 hours in an air atmosphere in an oven, the YI value of the heat-treated sample was measured in the same manner. Then, the ratio of the YI value after the heating to the YI value before the heating was calculated. A higher YI value ratio means that the EVOH resin composition was yellowed by the heating.

Dynamic Viscosity Behavior

The pulverized products of the EVOH resin compositions were each preheated at 250° C. for 5 minutes and then melt-kneaded for 30 minutes by operating a plastograph (available from Brabender Corporation) at a rotation speed of 50 rpm. The EVOH resin compositions were each evaluated for the dynamic viscosity behavior based on a value obtained by dividing a torque observed at the completion of the kneading (after a lapse of 30 minutes) by a torque observed at the start of the kneading (after a lapse of 0 minute). A lower value means that viscosity increase with time was suppressed and the dynamic viscosity behavior was excellent.

TABLE 1

|  | Example 1 | Example 2 | Example 3 | Comparative Example 1 |
| --- | --- | --- | --- | --- |
| EVOH resin (A) (parts) | 80 | 80 | 80 | 80 |
| Polyamide resin (B) (parts) | 20 | 20 | 20 | 20 |
| Amount (ppm) of iron compound (C) on metal basis | 0.1 | 1 | 10 | 0 |
| YI before heating | 52.3 | 45.4 | 45.8 | 56.3 |
| YI after heating | 65.1 | 65.4 | 61.5 | 70.9 |
| YI after heating/YI before heating | 1.24 | 1.44 | 1.34 | 1.26 |
| Dynamic viscosity behavior (30 minutes/ 0 minute) | 1.55 | 1.68 | 1.57 | 1.75 |

The EVOH resin compositions of Examples 1 to 3 each containing the iron compound (C) as shown above in Table 1 were substantially free from the coloration with their YI values lower than that of the EVOH resin composition of Comparative Example 1 not containing the iron compound (C). Further, the EVOH resin compositions of Examples 1 to 3 were substantially free from the coloration after the heating with their YI values lower than that of the EVOH resin composition of Comparative Example 1 after the heating.

Further, the EVOH resin compositions of Examples 1 to 3 each containing the iron compound (C) were excellent in dynamic viscosity behavior with viscosity increase thereof suppressed as compared with the EVOH resin composition of Comparative Example 1 not containing the iron compound (C). The EVOH resin composition of Example 1 was particularly excellent, because the YI increase ratio during the heating was the smallest and the dynamic viscosity behavior was represented by the most preferred value.

While specific forms of the embodiments of the present disclosure have been shown in the aforementioned examples, the examples are merely illustrative but not limitative. It is contemplated that various modifications apparent to those skilled in the art could be made within the scope of the disclosure.

The EVOH resin composition of the present disclosure is substantially free from coloration that may otherwise occur due to thermal degradation. Therefore, the EVOH resin composition of the present disclosure is useful as a material for packaging general foods, condiments such as mayonnaise and dressing, fermented foods such as miso, fat and oil such as salad oil, beverages, cosmetics, and pharmaceutical products, and particularly useful as a hot-water sterilizable packaging material.

The invention claimed is:

1. An ethylene-vinyl alcohol copolymer composition comprising:
   (A) an ethylene-vinyl alcohol copolymer;
   (B) a polyamide resin; and
   (C) an iron compound;
   wherein a weight ratio of the ethylene-vinyl alcohol copolymer (A) to the polyamide resin (B) is (A)/(B)=99/1 to 60/40; and
   wherein the iron compound (C) is present in an amount of 0.01 to 10 ppm on a metal basis based on the weight of the ethylene-vinyl alcohol copolymer composition.

2. Pellets comprising the ethylene-vinyl alcohol copolymer composition according to claim 1.

3. A multilayer structure comprising a layer that comprises the ethylene-vinyl alcohol copolymer composition according to claim 1.

* * * * *